United States Patent
Pfister et al.

(10) Patent No.: US 6,748,559 B1
(45) Date of Patent: Jun. 8, 2004

(54) METHOD AND SYSTEM FOR RELIABLY DEFINING AND DETERMINING TIMEOUT VALUES IN UNRELIABLE DATAGRAMS

(75) Inventors: Gregory Francis Pfister, Austin, TX (US); Giles Roger Frazier, Austin, TX (US); Danny Marvin Neal, Round Rock, TX (US); Steven Mark Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 741 days.

(21) Appl. No.: 09/692,349

(22) Filed: Oct. 19, 2000

(51) Int. Cl.$^7$ ................................................. G06F 11/00
(52) U.S. Cl. ............................... 714/56; 714/4; 709/226
(58) Field of Search ............................... 714/56, 55, 4, 714/43; 709/226; 718/104

(56) References Cited

U.S. PATENT DOCUMENTS

| | | | | |
|---|---|---|---|---|
| 5,819,019 A | * | 10/1998 | Nelson | 714/4 |
| 5,946,465 A | * | 8/1999 | Chmielewski et al. | 709/226 |
| 6,076,114 A | * | 6/2000 | Wesley | 709/235 |
| 6,405,236 B1 | * | 6/2002 | Nieratschker | 709/200 |
| 6,405,337 B1 | * | 6/2002 | Grohn et al. | 714/749 |

* cited by examiner

Primary Examiner—Robert Beausoliel
Assistant Examiner—Marc Duncan
(74) Attorney, Agent, or Firm—Mark E. McBurney; Bracewell & Patterson, L.L.P.

(57) ABSTRACT

A method for managing allocation of network resources within the distributed computer system is provided. Specifically, the network traversal time and the end node response time for requests and/or packets being routed in a switch-connected system area network are utilized to determine the total round trip time for completion of the particular network operation. The sum of the timeout values for all switches that participate in routing the request from a requester (source) to the receptor node (target) is provided to the requester's channel adapter (CA). The time-out values are provided by the switch manufacturer and are sent to a network Subnet Manager (SM) via SM packets (SMP). The timeout values added together represent the SubnetTimeout. The time-out value of the target channel adapter (CA), the ResponseTime, is also provided to the requester. The requester then utilizes one of two timeout equations to calculate the overall response time required for the request to be completed. A timer is started and the elapsed time to complete the request is monitored and compared with the overall response time calculated. When the timer expires before a response is received at the requester, the operation is assumed to have failed and the network resources being utilized by the request may be reallocated to another network operation.

30 Claims, 6 Drawing Sheets

METHOD AND SYSTEM FOR RELIABLY DEFINING AND DETERMINING TIMEOUT VALUES IN UNRELIABLE DATAGRAMS

The present invention is related to the subject matter of the following commonly assigned, co-pending United States Patent Applications filed concurrently herewith: Ser. No. 09/692,842 entitled "Method and System for Informing An Operating System In A System Area Network When A New Device Is Connected"; Ser. No. 09/692,347 entitled "Efficient Process for Handover Between Subnet Managers"; Ser. No. 09/692,347 entitled "Method And System For Scalably Selecting Unique Transaction Identifiers"; and Ser. No. 09/692,353 entitled "Method and System for choosing a Queue Protection Key That is Tamper-proof From An Application". The content of the above-referenced applications is incorporated herein by reference.

BACKGROUND OF THE INVENTION

1. Technical Field

The present invention relates in general to computer networks and, in particular, to communications between nodes on a computer network. Still more particularly, the present invention relates to a method and system for determining timeout values for network processes and utilizing the timeout values to free network resources in a System Area Network.

2. Description of the Related Art

Distributed computer networks are known in the art. In a traditional network, individual components of the network are interconnected via a parallel bus, such as a PCIX bus. The parallel bus has a relatively small number of plug-in ports for connecting the components. The number of plug-in-ports is set (i.e., the number cannot be increased). At maximum loading, a PCIX bus transmits data at about 1 Gbyte/second.

The introduction of high performance adapters (e.g., SCSI adapters), Internet-based networks, and other high performance network components has resulted in increased demand for bandwidth, faster network connections, distributed processing functionality, and scaling with processor performance. These and other demands are quickly outpacing the current parallel bus technology and are making the limitations of parallel buses even more visible. PCIX bus, for example, is not scalable, i.e., the length of the bus and number of slots available at a given frequency cannot be expanded to meet the needs for more components, and the limitation hinders further development of fast, efficient distributed networks, such as system area networks. New switched network topologies and systems are required to keep up with the increasing demands.

The present invention recognizes the need for faster, more efficient computer networks offering the features demanded by the developments of technology. More specifically, the present invention recognizes the need for providing a management system by which resources on a distributed computer network are efficiently allocated to processes or operations on the network.

SUMMARY OF THE INVENTION

A method for managing allocation of network resources within a distributed computer system is provided. The invention is applicable to a distributed computing system, such as a system area network, having end nodes, switches, and routers, and links interconnecting these components. Each end node uses send and receive queue pairs to transmit and receive messages. A source end node segments a message into packets and transmits the packets over the links. The switches and routers interconnect the end nodes and route the packets to the appropriate target end node. The target end node then reassembles the packets into the message.

In the method of the invention, the network traversal time and the end node response time for requests and/or packets being routed in a switch-connected system area network are utilized to determine the total round trip time for completion of the particular network operation. The sum of the timeout values for all switches that participate in routing the request from a requester (source) to the receptor node (target) is provided to the requester's channel adapter (CA). The time-out values are provided by the switch manufacturer and are sent to a network Subnet Manager (SM) via SM packets (SMP). The timeout values added together represent the SubnetTimeout. The time-out value of the target channel adapter (CA), the ResponseTime, is also provided to the requester. The requester then utilizes one of two timeout equations to calculate the. overall response time required for the request to be completed. A timer is started and the elapsed time to complete the request is monitored and compared with the overall response time calculated. When the timer expires before a response is received at the requester, the operation is assumed to have failed and the network resources being utilized by the request may be reallocated to another network operation.

Another embodiment of the invention operates at an end node that is receiving packets of a message (i.e., a target end node). After a packet arrives, the target end node begins a time count and monitors the time for receipt of the next packet. When the next packet is not received by a predetermined, time-out time value, the resources of the target end node are released for use by other network operations.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention is directed to a resource management mechanism in a distributed computer system, such as a system area network (SAN). The invention ensures reliable connection and reliable datagram communication between end nodes of SAN by monitoring for failed (or timed-out) communication requests and releasing resources utilized for that request accordingly.

In order to appreciate the environment within which the invention is preferably practiced, a description of a SAN configured with routers, switches, and end nodes, etc. is provided below. Presentation of the environment and particular functional aspects of the environment which enable the invention to be practiced are provided with reference to FIGS. 1–5. Section headings have been provided to distinguish the hardware and software architecture of the SAN. However, those skilled in the art understand that the descriptions of either architecture necessarily includes references to both components.

SAN HARDWARE ARCHITECTURE

Figure 1:
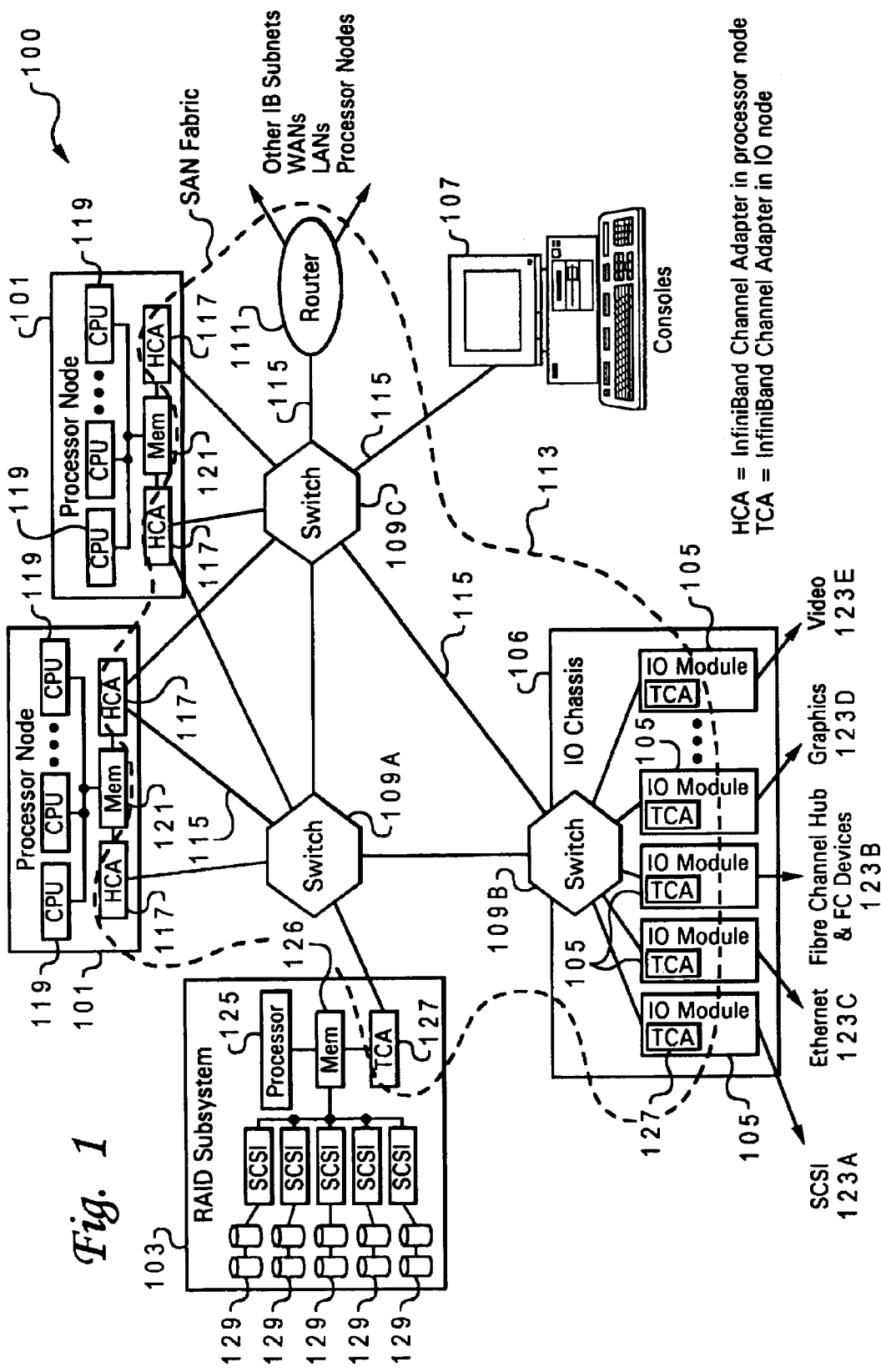
FIG. 1 depicts a system area network (SAN) in which the present invention is preferably implemented.

With reference now to the figures and in particular with reference to FIG. 1, there is illustrated an exemplary embodiment of a distributed computer system. Distributed computer system 100 represented in FIG. 1 is provided merely for illustrative purposes, and the embodiments of the present invention described below can be implemented on computer systems of numerous other types and configurations. For example, computer systems. implementing the present invention may range from a small server with one processor and a few input/output (I/O) adapters to very large parallel supercomputer systems with hundreds or thousands of processors and thousands of I/O adapters. Furthermore, the present invention can be implemented in an infrastructure of remote computer systems connected by an Internet or intranet.

As shown in FIG. 1, distributed computer system 100 includes a system area network (SAN) 113, which is a high-bandwidth, low-latency network interconnecting nodes within the distributed computer system. More than one (1) SAN 113 may be included in a distributed computer system 100 and each SAN 113 may comprise multiple sub-networks (subnets).

A node is herein defined to be any component that is attached to one or more links of a network. In the illustrated distributed computer system, nodes include host processors 101, redundant array of independent disks (RAID) subsystem 103, I/O adapters 105, switches 109A–109C, and router 111. The nodes illustrated in FIG. 1 are for illustrative purposes only, as SAN 113 can connect any number and any type of independent nodes. Any one of the nodes can function as an end node, which is herein defined to be a device that originates or finally consumes messages or frames in the distributed computer system 100.

SAN 113 is the communications and management infrastructure supporting both I/O and inter-processor communications (IPC) within distributed computer system 100. Distributed computer system 100, illustrated in FIG. 1, includes a switched communications fabric (i.e., links, switches and routers) allowing many devices to concurrently transfer data with high-bandwidth and low latency in a secure, remotely managed environment. End nodes can communicate over multiple ports and utilize multiple paths through SAN 113. The availability of multiple ports and paths through SAN 113 can be employed for fault tolerance and increased-bandwidth data transfers.

SAN 113 includes switches 109A–109C and routers 111. Switch 109A–109C connects multiple links together and allows routing of packets from one link to another link within SAN 113 using a small header Destination Local Identifier (DLID) field. Router 111 is capable of routing frames from one link in a first subnet to another link in a second subnet using a large header Destination Globally Unique Identifier (DGUID). Router 111 may be coupled via wide area network (WAN) and/or local area network (LAN) connections to other hosts or other routers.

In SAN 113, host processor nodes 101 and I/O nodes 106 include at least one Channel Adapter (CA) to interface to SAN 113. Host processor nodes 101 include central processing units (CPUs) 119 and memory 121. In one embodiment, each CA is an endpoint that implements the CA interface in sufficient detail to source or sink packets transmitted on SAN 113. As illustrated, there are two CA types, Host CA (HCA) 117 and Target CA (TCA) 127. HCA 117 is used by general purpose computing nodes to access SAN 113. In one implementation, HCA 117 is implemented in hardware. In the hardware implementation of HCA 117, HCA hardware offloads much of CPU and I/O adapter communication overhead. The hardware implementation of HCA 117 also permits multiple concurrent communications over a switched network without the traditional overhead associated with communicating protocols. Use of HCAs 117 in SAN 113 also provides the I/O and IPC consumers of distributed computer system 100 with zero processor-copy data transfers without involving the operating system kernel process. HCA 117 and other hardware of SAN 113 provide reliable, fault tolerant communications.

The I/O chassis 106 includes I/O adapter backplane and multiple I/O adapter nodes 105 that contain adapter cards. Exemplary adapter cards illustrated in FIG. 1 include SCSI adapter card 123A, adapter card 123B to fiber channel hub and FC-AL devices, Ethernet adapter card 123C, graphics adapter card 123D, and video adapter card 123E. Any known type of adapter card can be implemented. The I/O chassis 106 also includes switch 109B in the I/O adapter backplane to couple adapter cards 123A–123E to SAN 113.

RAID subsystem 103 includes a microprocessor 125, memory 126, a Target Channel Adapter (TCA) 127, and multiple redundant and/or striped storage disks 129.

In the illustrated SAN 113, each link 115 is a full duplex channel between any two network elements, such as end nodes, switches 109A–109C, or routers 111. Suitable links 115 may include, but are not limited to, copper cables; optical cables, and printed circuit copper traces on backplanes and printed circuit boards. The combination of links 115 and switches 109A–109C, etc. operate to provide point-to-point communication between nodes of SAN 113.

SAN SOFTWARE ARCHITECTURE

Software Components

Figure 2:
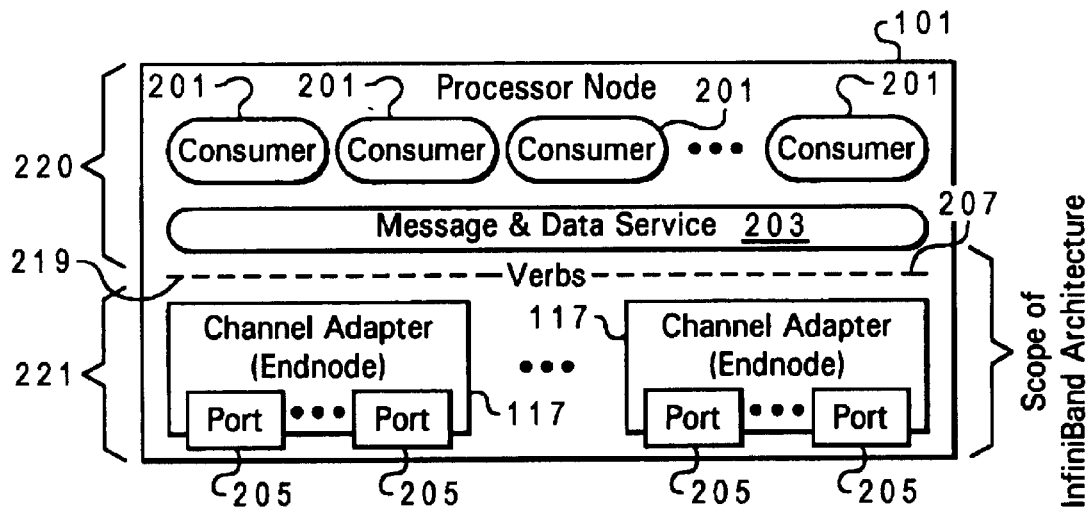
FIG. 2 is a diagram of software aspects of an exemplary host processor end node for the SAN of FIG. 1 in accordance with the present invention.

Software and hardware aspects of an exemplary host processor node 101 are generally illustrated in FIG. 2. Host processor node 101 includes one or more processors that execute a set of consumer processes 201. Host processor node 101 includes HCA 117 with ports 205. Each port 205 connects to a link 115 of SAN 113. Ports 205 can connect to one SAN subnet or multiple SAN subnets. Utilizing message and data services 203, consumer processes 201 transfer messages to SAN 113 via verbs interface 207. Verbs interface 207 is generally implemented with an operating-system specific programming interface.

Figure 3:
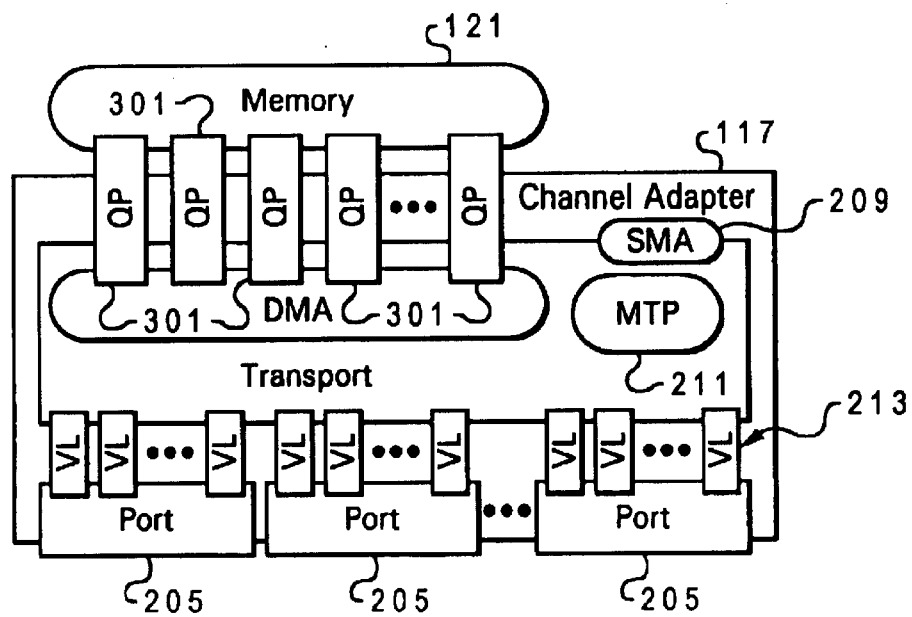
FIG. 3 is a diagram of an example host channel adapter of the SAN of FIG. 1 in accordance with the present invention.

A software model of HCA 117 is illustrated in FIG. 3. HCA 117 includes a set of queue pairs (QPs) 301, which transfer messages across ports 205 to the subnet. A single HCA 117 may support thousands of QPs 301. By contrast, TCA 127 in an I/O adapter typically supports a much smaller number of QPs 301. Also illustrated are subnet management administration (SMA)209, management packets 211 and a number of virtual lanes 213, which connect transport layer with ports 205.

Figure 5:
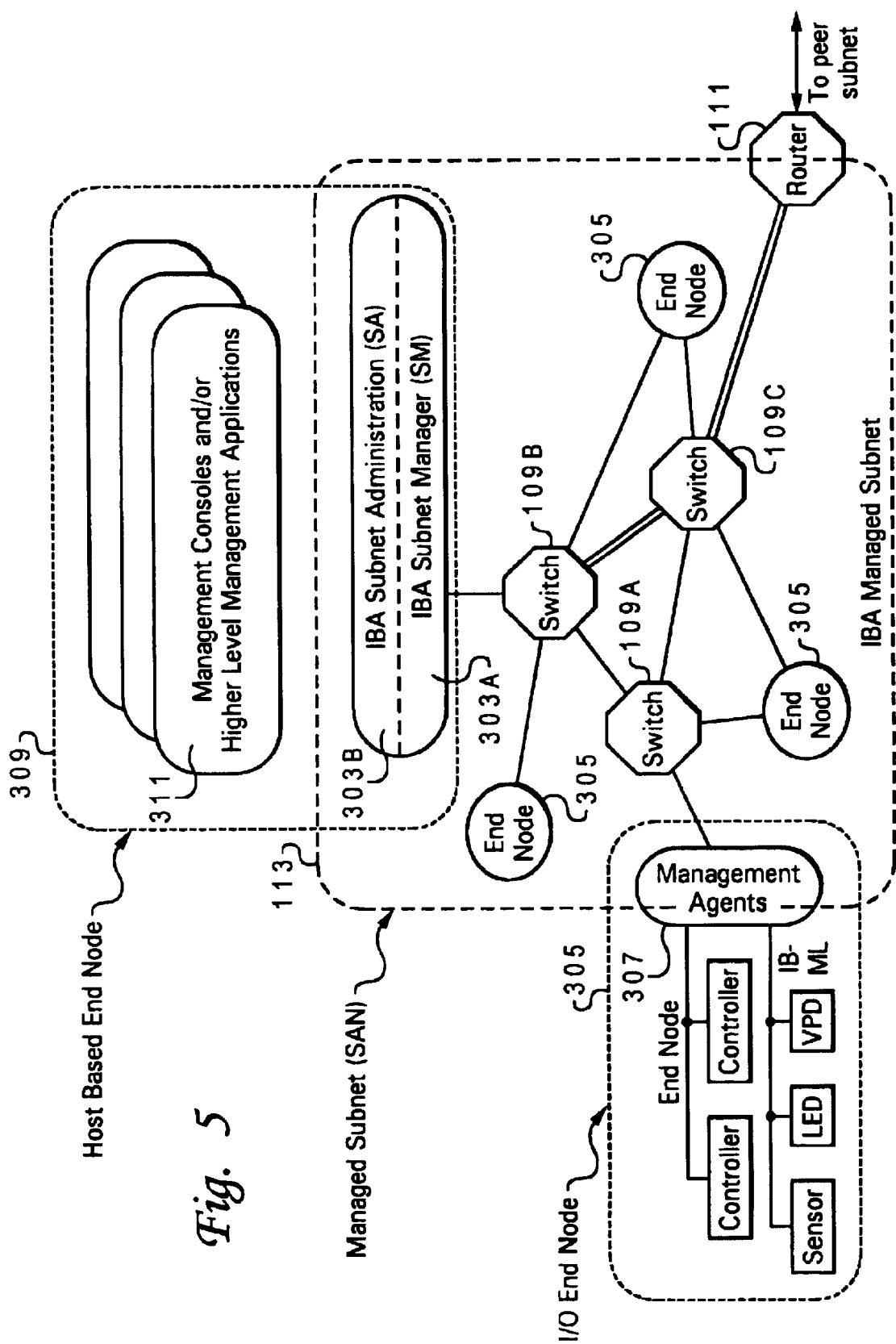
FIG. 5 is a diagram of the software aspects of SAN management model in accordance with the present invention.

Turning now to FIG. 5, there is illustrated a software management model for nodes on SAN 113. SAN architecture management facilities provides a Subnet Manager (SM) 303A, a Subnet Administration (SA) 303B, and an infrastructure that supports a number of general management services. The management infrastructure includes a Subnet Management Agent (SMA) 307 operating in each node and defines a general service interface that allows additional general services agents. Also, SAN architecture defines a common management datagram (MAD) message structure for communicating between managers and management agents.

SM 303A is responsible for initializing, configuring and managing switches, routers, and channel adapters. The SM can be implemented within other devices, such as a channel adapter or a switch. One SM 303A of SAN is dedicated as a master SM and is responsible for: discovering the subnet topology; configuring each channel adapter port with a range of Local Identification (LID) numbers, Global Identification (GID) number, subnet prefix, and Partition Keys (P_Keys); configuring each switch with a LID, the subnet prefix, and with its forwarding database; and maintaining the end node and service databases for the subnet to provide a Global Unique Identification (GUID) number to LID/GID resolution service as well as a services directory. Thus, management of SAN 113 and SAN components, such as HCAs 117, TCAs (or end nodes) 127, switches 109, and routers 111 are completed utilizing Subnet Management (SM) 303A and Subnet Administration (SA) 303B. SMPs are used to discover, initialize, configure, and maintain SAN components through management agents 307 of end nodes 305. SAN SA packets are used by SAN components to query and update subnet management data. Control of some aspects of the subnet management are provided via a user management console 311 in host-based end node 309.

MESSAGE TRANSFER PROCESS

SAN 113 provides the high-bandwidth and scalability required for I/O and also supports the extremely low latency and low CPU overhead required for Interprocessor Communications (IPC). User processes can bypass the operating system (OS) kernel process and directly access network communication hardware, such as HCAs 117, which enable efficient message passing protocols. SAN 113 is suited to current computing models and is a building block for new forms of I/O and computer cluster communication. SAN 113 allows I/O adapter nodes 105 to communicate among themselves or communicate with any or all of the processor nodes 101 in the distributed computer system. With an I/O adapter attached to SAN 113, the resulting I/O adapter node 105 has substantially the same communication capability as any processor node 101 in the distributed computer system.

For reliable service types of messages, end nodes, such as host processor nodes 101 and I/O adapter nodes 105, generate request packets and receive acknowledgment packets. Switches 109A–109C and routers 111 pass packets along from the source to the target (or destination). Except for the variant CRC trailer field, which is updated at each transfer stage in the network, switches 109A–109C pass the packets along unmodified. Routers 111 update the variant CRC trailer field and modify other fields in the header as the packet is routed.

In SAN 113, the hardware provides a message passing mechanism that can be used for Input/Output (I/O) devices and Interprocess Communications (IPC) between general computing nodes. Consumers (i.e., processing devices connected to end nodes) access SAN 113 message passing hardware by posting send/receive messages to send/receive work queues (WQ), respectively, on a SAN Channel Adapter (CA).

A message is herein defined to be an application-defined unit of data exchange, which is a primitive unit of communication between cooperating processes. A packet (or frame) is herein defined to be one unit of data encapsulated by networking protocol headers (and trailer). The headers generally provide control and routing information for directing the packet (or frame) through SAN 113. The trailer generally contains control and cyclic redundancy check (CRC) data for ensuring that frames are not delivered with corrupted content.

Consumers use SAN verbs to access HCA functions. The software that interprets verbs and directly accesses the CA is known as the Channel Interface (CI) 219. Send/Receive work queues (WQ) are assigned to a consumer as a Queue Pair (QP). Messages may be sent over five different transport types, Reliable Connected (RC), Reliable Datagram (RD), Unreliable Connected (UC), Unreliable Datagram (UD), and Raw Datagram (RawD). Consumers retrieve the results of these messages from a Completion Queue (CQ) through SAN send and receive work completions (WC). The source CA takes care of segmenting outbound messages and sending them to the destination. The destination or target CA takes care of reassembling inbound messages and placing them in the memory space designated by the destination's consumer. These features are illustrated in the figures below.

Figure 4:
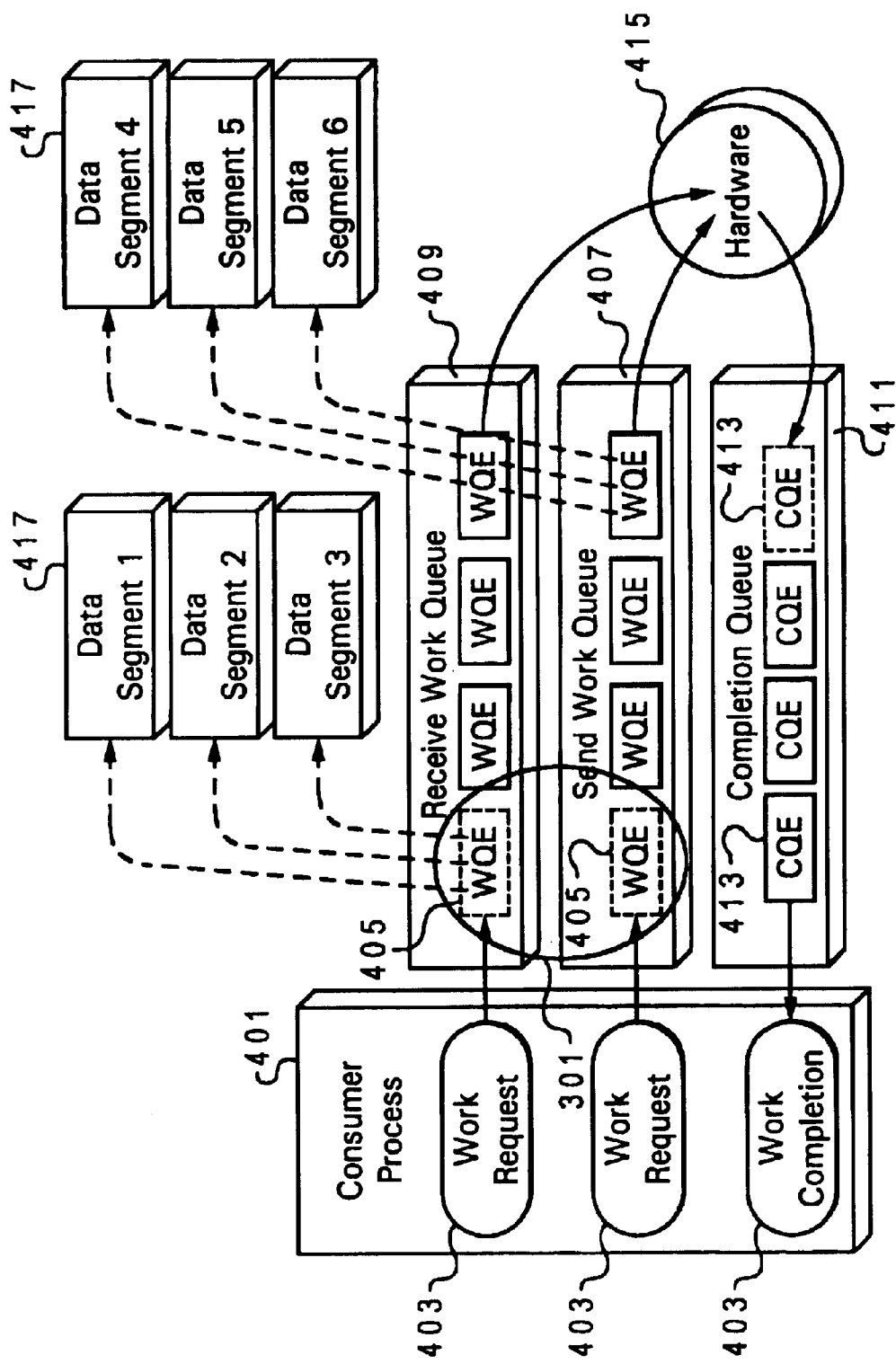
FIG. 4 is a diagram of the work queue and completion queue process for the queue pairs (QPs) of FIG. 3.

Referring now to FIG. 4, there is illustrated a block diagram of work and completion queue processing. Each QP 301 provides an input to a Send Work Queue (SWQ) 407 and a Receive Work Queue (RWQ) 409. SWQ 407 sends channel and memory semantic messages, and RWQ 409 receives channel semantic messages. A consumer calls a verb (within verbs interface 207) to place Work Requests (WRs) into a WQ. A Send WR 403 is a channel semantic operation to push a set of local data segments 417 to the data segments referenced by a remote node's Receive WQE 405. Each of the Send WR's data segments 417 contains a virtually contiguous memory region. The virtual addresses used to reference the local data segments 417 are in the address context of the process that created the local QP 301.

As shown in FIG. 4, WRs 403 that have been placed onto a WQ by consumer process 401 are referred to as work queue elements (WQEs) 405. WQEs 405 are executed by hardware 415 in HCA 117. SWQ 407 contains WQEs 405 that describe data to be transmitted on the SAN fabric. RWQ 409 contains WQEs 405 that describe where to place incoming channel semantic data received from SAN 113.

In one embodiment, Receive Work Queues 409 only support one type of WQE 405, which is referred to as a receive WQE. The receive WQE provides a channel semantic operation describing a local memory space into which incoming send messages are written. The receive WQE includes a scatter list describing several virtually contiguous memory spaces. An incoming send message is written to these memory spaces. The virtual addresses are in the address contexts of the process that created the local QP 301.

Verbs interface 207 also provide a mechanism for retrieving completed work from completion queue 411. Completion queue 411 contains Completion Queue Elements (CQEs) 413 which 413 contain information about previously completed WQEs 405. Completion queues 413 are employed to create a single point of completion notification for multiple QPs 301. CQE 413 contains sufficient information to determine the QP 301 and specific WQE 405 that completed. A completion queue context (not shown) is a block of information that contains pointers to, length, and other information needed to manage individual completion queues 411.

Remote Operation Functionality

SAN 113, with its interlinked arrangement of components and sub-components, provides a method for completing remote operations, by which processor nodes may directly control processes in I/O nodes. Remote operation also permits the network to manage itself. A remote direct memory access (RDMA) Read WR provides a memory semantic operation to read a virtually contiguous memory space on a remote node. A memory space can either be a portion of a memory region or a portion of a memory window. A memory region references a previously registered set of virtually contiguous memory addresses defined by a virtual address and length. A memory window references a set of virtually contiguous memory addresses which have been bound to a previously registered region.

The RDMA Read WR writes the data to a virtually contiguous local memory space. Similar to Send WR 403, virtual addresses used by the RDMA Read WQE to reference the local data segments are in the address context of the process that created the local QP 301. The remote virtual addresses are in the address context of the process owning the remote QP targeted by the RDMA Read WQE.

RDMA Write WQE provides a memory semantic operation to write a virtually contiguous memory space on a remote node. RDMA Write WQE contains a scatter list of local virtually contiguous memory spaces and the virtual address of the remote memory space into which the data from the local memory spaces is written.

RDMA FetchOp WQE provides a memory semantic operation to perform an atomic operation on a remote word. RDMA FetchOp WQE is a combined RDMA Read, Modify, and Write operation. RDMA FetchOp WQE can support several read-modify-write operations, such as "Compare and Swap if Equal."

A Bind (unbind) remote access key (R_Key) WQE provides a command to the HCA hardware to modify a memory window by associating the memory window to a memory region. A second command to destroy a memory window by disassociating the memory window to a memory region is also provided. The R_Key is part of each RDMA access and is used to validate that the remote process has permitted access to the buffer.

Managing SAN Resources Utilizing Timeout Values

Utilization of the hardware, firmware, and software context in SAN 113 configuration preferably includes a mechanism by which the effectiveness of the communication and processes may be monitored and resources made available for additional processes as quickly as possible. SAN architecture management facilities provide a Subnet Manager (SM) and an infrastructure that supports a number of general management services. The management infrastructure provides a Subnet Management Agent (SMA) in each node and defines a general service interface that allows additional general services agents. The SAN architecture defines a common management datagram (MAD) message structure for communicating between managers and management agents.

The SM is an entity attached to a subnet that is responsible for configuring and managing switches, routers, and channel adapters (CAs). The SM can be implemented as part of another device, such as a channel adapter or a switch. The master SM is responsible for, among other things, reading values from the switches, routers, and CAs, and utilizing that information to configure the rest of SAN 113. network.

SAN 113 is queried and configured by means of SMPs. SM, by means of the SMPs, obtains information about the SAN components and can set configuration values in the components to configure SAN 113 to have desired characteristics.

When requests are sent across SAN 113, resources are retained (utilized) to receive the response. The time period required for the requester to utilize network resources to accept the response must be known so that the network resources may be released to other processes (or operations) if no response is received within that time. Similarly, when a port is receiving a sequence of packets that contain parts of a message, the receiving port retains resources to receive subsequent packets of the message after the first packet is received. The time period that the receiver retains the resources to accept subsequent packets must be known so that resources can be released if no subsequent packets are received. Resources of the network may include OS resources, processor resources, and hardware resources. During a standard network operation, any combination of the resources may be utilized to complete the operation.

The preferred embodiment of the present invention determines the response time-out values to apply to a request that is issued on SAN 113 by a requester to a responder. The invention provides a uniform technique to determine how long a management entity of SAN 113 should wait before assuming a request has not been responded to by the recipient or a recipient's response to the request has been lost. Three time periods are employed by the requesters (or SM) to calculate the response time-out value. The time periods are (1) the maximum amount of time required for a request to move from the requester to the responder, (2) the maximum amount of time within which the responder will respond, and (3) the maximum amount of time for the response to move from the responder to the requester. The worst case value of the time the response packet takes to travel from a node to any other node (or from any other node to the node) is utilized to represent both the first and third time periods. Evaluation of the worst case value may be completed with a single evaluation, and the time value produced is referred to herein as SubnetTimeout. Utilization of the worst case value provides an overestimation in some cases, but covers the entire spectrum of possible routing delays. The SubnetTimeout may thus be defined as the maximum amount of time required for a packet to reach a port from anywhere in the network (SAN 113). The SubnetTimeout is initialized by the master SM when it configures routes through SAN 113.

The second time period, the maximum amount of time within which the managed entity or responder (i.e., the CA of the responder) will take to process a request or a response, is a design parameter similar to the time value of the switches. The value for the second time period is referred to herein as the ResponseTime. The ResponseTime is initialized by the managed entity and held in a data structure that announces the availability of the managed entity on a SAN port.

In order to determine the SubnetTimeout delays, the delays that exist through each of the switches from one end of the routing path to the other are required. In the preferred embodiment, the value is determined by the particular rating or design parameters of the switch, which is provided by the switch manufacturer. During configuration of the switch by the SM, the SM issues an SMP request to the switch requesting its delay information. The SM calculates the worst case delay across the subnet from each possible endpoint that can source a request to each other endpoint that is accessible to that requester. The SM then stores the worst case delay value at the requester during the configuration process for that requester end node.

Figure 7:
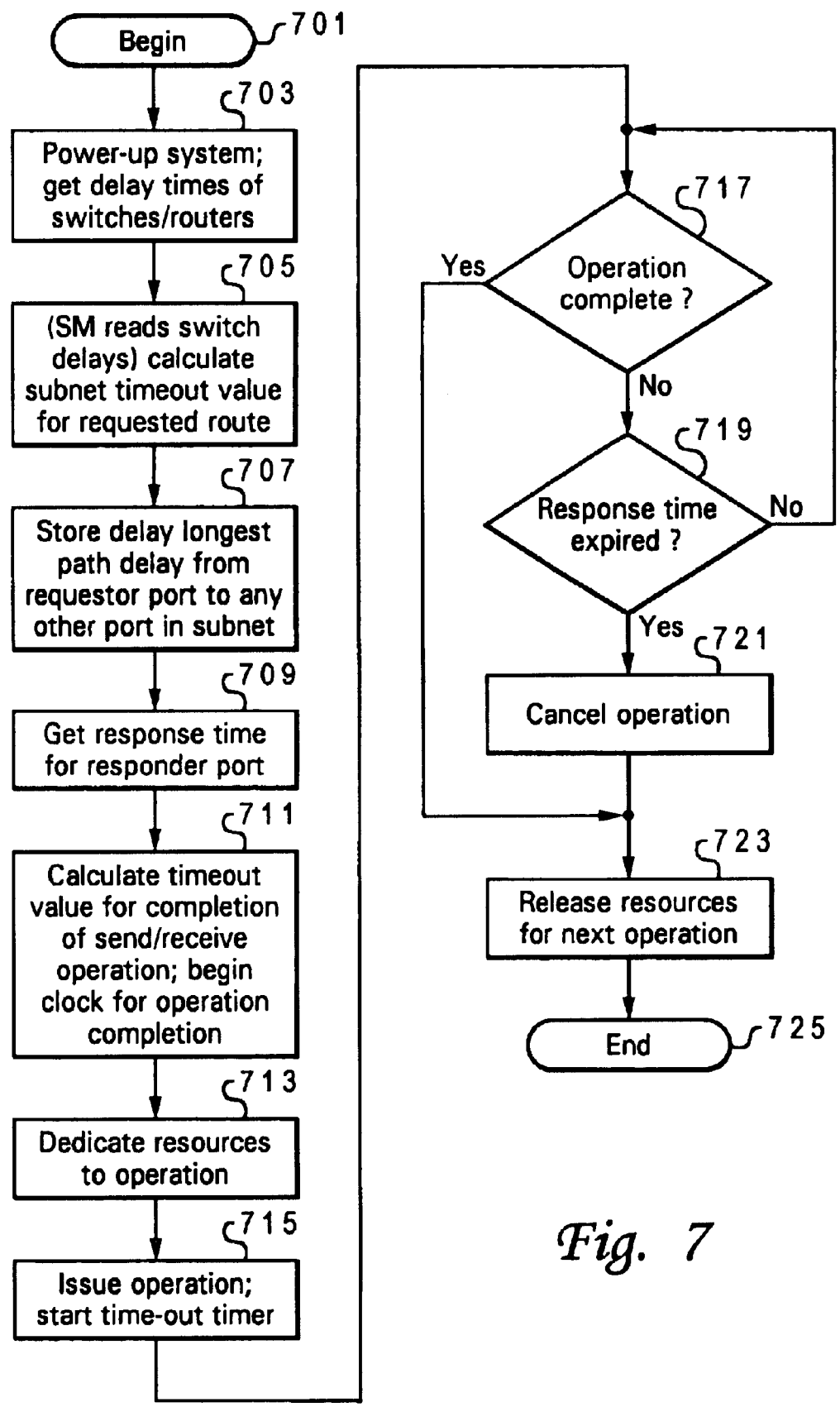
FIG. 7 illustrates a flow chart of the processes of determining timeout values and subsequent application during operation in accordance with a preferred embodiment of the invention.

FIG. 7 illustrates the processes by which the SubnetTimeout and Response Time values are determined and utilized during routing operations on SAN 113. The process begins at block 701, and thereafter proceeds to block 703 where the delay times of the switches in a routing path are obtained after power-up of the system or during configuration of a route for transmitting data. The SM is provided the switch delays along each path via SMP requests sent to each switch and SMP responses received with the requested information. Utilizing these switch delay values, the SM determines the SubnetTimeout for each path at block 705. Transmissions on links 115, are almost instantaneous and have minimal effects on the actual routing time.

Thus, in the preferred embodiment, link delay times are not utilized in the calculation of SubnetTimeout. The SM stores at each port only the longest path delay from that port to any other port in the subnet at block 707. As stated above, the SubnetTimeout value is made available to each requester by storing it in a data structure in each node using SMPs. Since there may be a large number of ports and paths in a subnet, the invention avoids storing the delay time for each path from a given port by storing only the longest delay value and thus reduces the amount of hardware required to store SubnetTimeout values at each end node.

In the preferred embodiment, when the responder is accessed for the first time, a pre-specified default ResponseTime is used in the management function. The default ResponseTime is an arbitrary time that is preferably long enough for any responder on SAN 113 to respond to a request. The actual response time of the responder is provided as a design specification by the manufacturer. The value provided represents the longest time that the CA of the responder will take to respond to a request. Once the initial request is received, the responder provides the actual ResponseTime to the requester, and the requester stores the ResponseTime value. The stored ResponseTime value is utilized for subsequent requests issued to the responder from the requester.

Still referring to FIG. 7, the ResponseTime for the responder is provided to the requester at block 709, and the overall round trip response time for the process is calculated at block 711. Two different calculations are utilized in different embodiments of the invention.

In the first embodiment, the round trip response time is calculated linearly in microseconds as:

Round Trip Response Time=2×(SubnetTimeout)+ResponseTime.

In another embodiment, each timeout value is utilized as a power of base two and the result is then multiplied by a pre-determined empirical factor (in microseconds ($\mu$s)). The calculation is completed as:

Round Trip Response Time=2*(4.096 $\mu s \times 2^{SubnetTimeout}$)+(4.096 $\mu s \times 2^{ResponseTime}$)

Some network resources are dedicated to the desired operation at block 713. The operation is then issued by the requester and the time-out timer at the requester is activated at block 715 with the round trip response time value as calculated in block 711. A check is made at block 717 to determine if the operation is complete. If the operation is not complete, the process checks the time-out timer to see if the time-out timer has expired, at block 719. If not, the check at block 717 for the completion of the operation is repeated. If the time-out timer has expired, the operation is canceled at block 721, and the resources are released for the next operation at block 723. Returning to block 717, if the operation is complete before the time-out timer expires, the process continues to block 723 where the resources are released for the next operation. After block 723, the operation ends at block 725. A requester thus knows the time that it should wait for the response to a request and releases resources dedicated to that request, only when the time expires.

Figure 6:
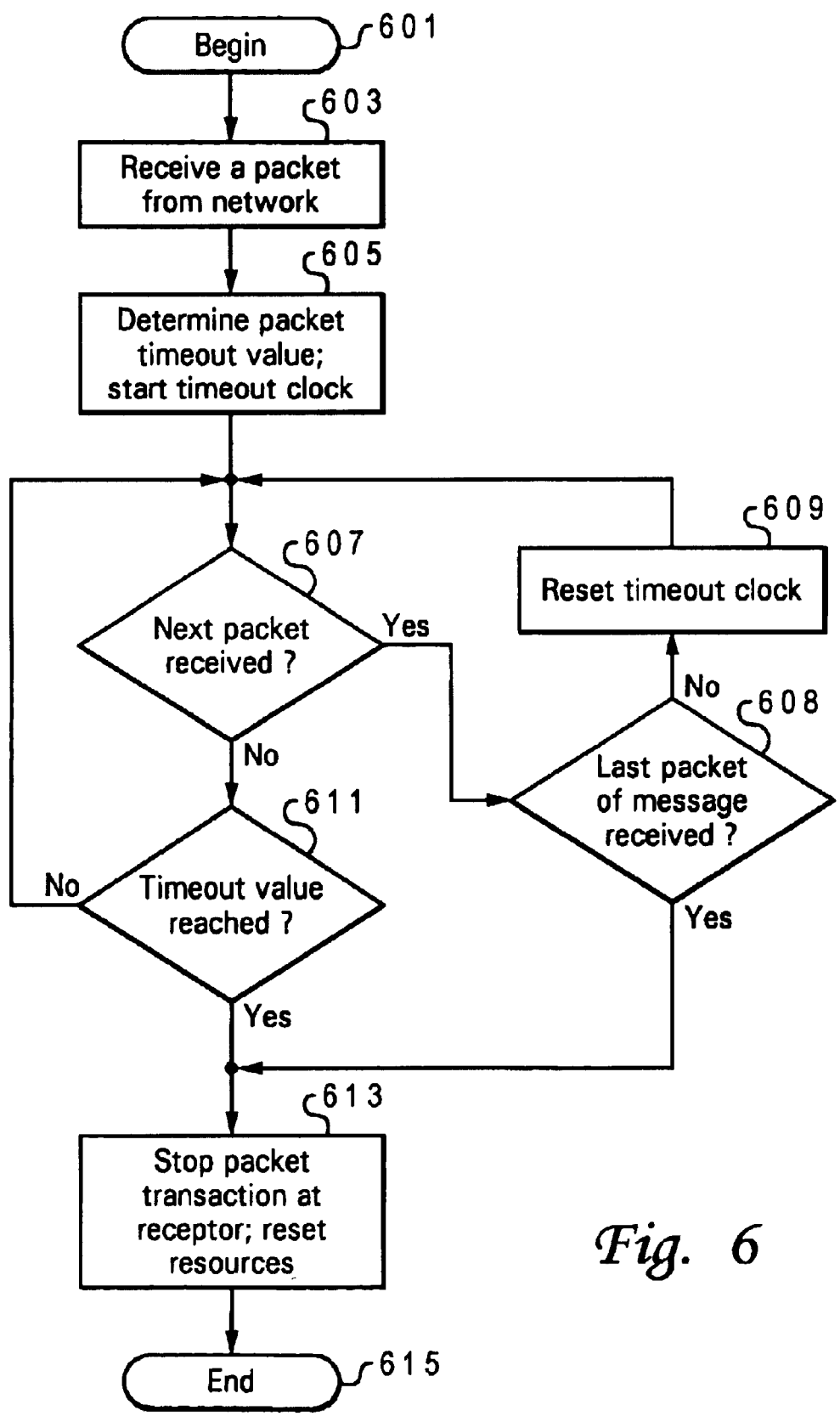
FIG. 6 illustrates a flow chart of the process for application of timeout values for packet transfer in accordance with another embodiment of the invention.

FIG. 6 illustrates a second embodiment that utilizes timeout values during data routing operation on SAN 113. In the embodiment, the time-outs are utilized when a multi-packet message (i.e. a message consisting of multiple MADs) is being sent by a sender (requester) and/or received at a receptor. During transmittal of the message, the sender has to transmit each packet within a certain time period of each other to ensure correct transmission and reception. Also, the receptor needs to know how long to wait for the next packet before it can assume that an error has occurred in transmission (e.g., one of the packets has been lost).

The worst case transmission time delays of SAN 113 (i.e., Subnet Timeout) is utilized. The time period for sending subsequent packets and for receiving subsequent packets are referred to herein as packet SendoffTime and packet ResponseTime, respectively. In the preferred embodiment, the SendofTime of the packets of the multipacket request is less than or equal to the ResponseTime of the responder receiving the packets, and the ResponseTime is utilized in evaluating when the message transmission has failed and resources may be reallocated. The timeout value is preferably calculated similarly to above except that the SubnetTimeout is not multiplied by two. Thus, the first equation can be expressed as:

One Way Timeout=SubnetTimeout+ResponseTime, and the second equation can be expressed as:

One Way Timeout=(4.096×$2^{SubnetTimeout}$)+(4.096×$2^{ResponseTime}$)

The process illustrated in FIG. 6 begins at block 601 and thereafter proceeds to block 603, at which a first packet is received at the receptor. The provided example details only the process occurring at the receptor, although in alternate embodiments, the invention completes a similar analysis at the sender. Returning to FIG. 6, the receptor CA initializes the timeout clock at block 605 with a predetermined packet time-out value (i.e., One Way Timeout). A determination whether a next packet has been received is completed at block 607. The determination is completed concurrently with a check (of the time-out timer) at block 611 whether the time-out value has been reached. If the next packet has been received, a check is performed at block 608 to determine if the packet is the last packet of the message and if the operation is complete at block 613. Otherwise, the timeout clock is reset to check for the additional packets at block 609. If the next packet has not been received and the timeout value has been reached, then the packet transaction is stopped at the receptor, and the receptor resets the network resources at block 613. Then the process ends at block 615.

In the illustrated implementations, each port utilizes only two timeout values to support both round trip response time-outs and multi-packet message time-outs. Thus, the timeout schemes of the illustrated embodiments may to be completed with firmware (i.e., without additional hardware).

As a final matter, it is important to note that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analog communication links.

In the above detailed description of the preferred embodiments, reference is made to the accompanying drawings which form a part hereof, and in which are shown by way of illustration specific embodiments in which the invention may be practiced. It is to be understood that other embodiments may be utilized and structural or logical changes may be made without departing from the scope of the present invention. The above detailed description, therefore, is not to be taken in a limiting sense, and the scope of the present invention is defined by the appended claims.

What is claimed is:

1. A method for managing resources on a network, said method comprising the steps of:
    discovering routing delay times for at least one network route from a first end node to a second end node of a system area network (SAN);
    storing a longest one of said routing delay times at said first end node as a subnet timeout value;
    discovering a processing time for responding to operations at said second end node;
    calculating a completion time for a request sent from said first end node to said second end node utilizing said subnet timeout value and said processing time; and
    managing an allocation of resources of said SAN utilizing said completion time.

2. The method of claim 1, wherein said discovering routing delay times includes the steps of:
    issuing packets during configuration of said SAN to query each switch within said SAN for a delay time and return said delay time to a Subnet Manager of said SAN; and
    calculating said longest one of said routing delay times for each end node of said SAN utilizing one or more of said delay time.

3. The method of claim 1, wherein discovering a processing time includes the steps of:
    selecting an estimated response time corresponding to a longest possible response time during an issuing of a first request to said second end node;
    calculating the completion time for said first request utilizing said estimated response time; and
    subsequently querying said second end node for an actual response time.

4. The method of claim 3, further comprising the step of storing said estimated response time in a data structure at the first end node.

5. The method of claim 3, wherein said calculating step comprises the step of adding said estimated response time to two times the value of the subnet timeout.

6. The method of claim 1, wherein said managing step further comprises the steps of:
    allocating said resources to said request when said request is issued; and
    in response to a response to said request not arriving at said first end node within said completion time, freeing said resources of said SAN for utilization by a next network operation.

7. The method of claim 1, further including the step of:
    starting a time-out clock when said request is issued, wherein said managing step is triggered by an elapse of a time equal to said completion time on said time-out clock.

8. A method for efficient management of message transmission on a SAN, said method comprising the steps of:
    determining a one way timeout value at a receiving port corresponding to a maximum time for a packet of a message to reach said receiving port from a sending port on said SAN network, wherein each packet of said message is transmitted from said sending port within a time frame that is less than a Response Time of said receiving port;
    receiving a first packet of a message being transmitted on said SAN;
    allocating resources of said receiving port to receive additional packets of said message; and
    in response to an elapse of a time equal to said one way timeout value before receiving at least one of said additional packets, de-allocating said network resources of said port.

9. The method of claim 8, further comprising the step of signaling said sending port that a transmission of said message has failed.

10. A system area network comprising:
    at least a first end node and a second end node;
    at least one switch component connecting each of said first and second end nodes together;
    a subnet manager (SM) which issues Subnet Management Packets (SMPs) wherein said SM includes logic components to manage an allocation of resources of said SAN utilizing a calculated round trip completion time of a process.

11. The system are network of claim 10, further comprising:
    means for discovering routing delay times for at least one network route from a first end node to a second end node of said SAN;
    a storage medium that stores a longest one of said routing delay times at said first end node as a subnet timeout value;
    means for discover a processing time for responding to operations at said second end node; and
    logic for calculating a completion time for a request sent from said first end node to said second end node utilizing said subnet timeout value and said processing time.

12. The system area network of claim 11, wherein said SM further comprises logic for discovering routing delay times by issuing said SMPs during configuration of said SAN to query each of said at least one switch component within said SAN for a delay time and return said value to said Subnet Manager, and calculating said longest one of said routing delay times for each end node of said SAN utilizing one or more of said delay times.

13. The system area network of claim 11, wherein said first end node includes logic for selecting an estimated response time corresponding to a longest possible response time during an issuing of a first request to said second end node, calculating the completion time for said first request utilizing said estimated response time, and subsequently querying said second end node for an actual response time.

14. The system area network of claim 13, wherein said calculating logic includes an adder for adding said estimated response time to two times the value of the subnet timeout.

15. The system area network of claim 11, wherein said SM further includes logic for allocating said network resources to said request when said request is issued, wherein in response to a response to said request not arriving at said first end node within said completion time, said SM frees said resources of said SAN for utilization by a next network operation.

16. The system area network of claim 11, further comprising a time-out clock that is started when said request is issued, wherein SM management of network resources is triggered by an elapse of a time equal to said completion time on said time-out clock.

17. The system area network of claim 16, wherein said logic components are software components.

18. The system area network of claim 16, wherein said logic components are implemented in firmware.

19. A network comprising:
   a receiving port and a sending port;
   a connecting medium between said receiving port and said sending port; and
   logic housed within said receiving port for allocating and deallocating network resources based on a pre-selected subnet timeout value.

20. The network of claim 19, further comprising:
   logic that determines a one way timeout value at a receiving port corresponding to a maximum time for a packet of a message to reach said receiving port from a sending port on said network;
   means for receiving a first packet of a message being transmitted on said network and allocating resources of said receiving port to receive additional packets of said message; and
   allocation/deallocation unit that, in response to an elapse of a time equal to said one way timeout value before receiving at least one of said additional packets, de-allocates network resources of said port.

21. The network of claim 20, wherein said logic includes an adder for adding a value corresponding to a subnet timeout and a value corresponding to a ResponseTime to generate said one way timeout value.

22. A computer program product comprising:
   a computer readable medium: and
   program instructions on said computer readable medium for:
      discovering routing delay times for at least one network route from a first end node to a second end node of a network;
      storing a longest one of said routing delay times at said first end node as a subnet timeout value;
      discovering a processing time for responding to operations at said second end node;
      calculating a completion time for a request sent from said first end node to said second end node utilizing said subnet timeout value and said processing time; and
      managing an allocation of resources of said network utilizing said completion time.

23. The computer program product of claim 22, wherein said discovering routing delay times further comprises program instructions for:
      issuing Subnet Management Packets (SMPs) during configuration of said network to query each switch within said network for a delay time and return said delay time to a Subnet Manager of said network; and
      calculating said longest one of said routing delay times for each end node of said network utilizing one or more of said delay times.

24. The computer program product of claim 22, wherein said discovering a processing time includes program instructions for:
      selecting an estimated response time corresponding to a longest possible response time during an issuing of a first request to said second end node;
      calculating the completion time for said first request utilizing said estimated response time; and
      subsequently querying said second end node for an actual response time.

25. The computer program product of claim 24, further comprising program instructions for storing said estimated response time in a data structure that announces availability of the management entity of said second end node to a system area network (SAN).

26. The computer program product of claim 24, wherein said calculating instructions comprises program instructions for adding said estimated response time to two times the value of the subnet timeout.

27. The computer program product of claim 22, wherein said managing instructions further comprises program instructions for:
      allocating said resources to said request when said request is issued; and
      in response to a response to said request not arriving at said first end node within said completion time, freeing said resources of said network for utilization by a next network operation.

28. The computer program product of claim 22, further including program instructions for starting a time-out clock when said request is issued, wherein said managing step is triggered by an elapse of a time equal to said completion time on said time-out clock.

29. A computer program product comprising:
   a computer readable medium; and
   program instructions on said computer readable medium for:
      determining a one way timeout value at a receiving port corresponding to a maximum time for a packet of a message to reach said receiving port from a sending port on a network;
      receiving a first packet of a message being transmitted on said network;
      allocating resources of said receiving port to receive additional packets of said message; and
      in response to an elapse of a time equal to said one way timeout value before receiving at least one of said additional packets, removing said allocation of network resources to said message.

30. The computer program product of claim 29, further comprising program instructions for signaling said sending port that a transmission of said message has failed.

* * * * *

UNITED STATES PATENT AND TRADEMARK OFFICE
CERTIFICATE OF CORRECTION

PATENT NO. : 6,748,559 B1
DATED : June 8, 2004
INVENTOR(S) : Pfister et al.

It is certified that error appears in the above-identified patent and that said Letters Patent is hereby corrected as shown below:

Title page,
Item [*] Notice, "bydays.days." should be -- by 741 days. --.

Column 5,
Line 2, "(SMA)290" should be -- (SMA) 290 --.

Column 8,
Line 5, "about the. SAN" should be -- about the SAN --.

Column 14,
Line 23, "the" should be -- a --.

Signed and Sealed this

Eighteenth Day of October, 2005

JON W. DUDAS
*Director of the United States Patent and Trademark Office*